United States Patent
Schmidt et al.

(10) Patent No.: US 6,236,493 B1
(45) Date of Patent: May 22, 2001

(54) OPTICAL COMPONENTS WITH A GRADED-INDEX STRUCTURE, AND METHOD OF MANUFACTURING SUCH COMPONENTS

(75) Inventors: Helmut Schmidt, Saarbrücken-Güdingen; Herbert Krug, Püttlingen; Peter W. Oliveira, Saarbrücken; Stefan Sepeur, Wadgassen, all of (DE)

(73) Assignee: Institut für Neue Materialien gemeinnützige GmbH, Saarbrücken (DE)

( * ) Notice: Subject to any disclaimer, the term of this patent is extended or adjusted under 35 U.S.C. 154(b) by 0 days.

(21) Appl. No.: 09/155,639

(22) PCT Filed: Apr. 3, 1997

(86) PCT No.: PCT/EP97/01678

§ 371 Date: Oct. 1, 1998

§ 102(e) Date: Oct. 1, 1998

(87) PCT Pub. No.: WO97/38333

PCT Pub. Date: Oct. 16, 1997

(30) Foreign Application Priority Data

Apr. 4, 1996 (DE) .............................................. 196 13 645

(51) Int. Cl.$^7$ .............................. G02B 26/00; G02B 3/00; G03C 5/00; G03G 17/04
(52) U.S. Cl. .......................... 359/296; 359/290; 359/654; 430/290; 430/34
(58) Field of Search .................................... 359/290–297, 359/300, 288, 654; 430/290, 34

(56) References Cited

U.S. PATENT DOCUMENTS

| | | | |
|---|---|---|---|
| 4,173,475 | * 11/1979 | Chandross et al. ................. | 430/290 |
| 4,403,031 | * 9/1983 | Borrelli et al. ...................... | 430/332 |
| 4,453,805 | * 6/1984 | Ashkin et al. ....................... | 359/300 |
| 4,514,053 | * 4/1985 | Borrelli et al. ...................... | 359/569 |
| 4,627,689 | * 12/1986 | Asher .................................. | 359/296 |
| 4,632,517 | * 12/1986 | Asher .................................. | 359/296 |
| 4,778,744 | * 10/1988 | Borrelli et al. ...................... | 430/290 |
| 4,867,544 | * 9/1989 | Bornstein et al. ................... | 359/654 |
| 5,100,589 | * 3/1992 | Ticknor ............................... | 264/1.3 |
| 5,104,210 | * 4/1992 | Tokas .................................. | 359/296 |
| 5,158,933 | * 10/1992 | Holtz et al. ............................. | 305/1 |
| 5,266,238 | * 11/1993 | Haacke et al. ...................... | 359/296 |
| 5,349,473 | * 9/1994 | Kurasawa et al. .................. | 359/654 |
| 5,360,834 | * 11/1994 | Popall et al. ........................... | 522/36 |
| 5,368,781 | * 11/1994 | Haacke et al. ...................... | 359/296 |
| 5,470,910 | * 11/1995 | Spanhel et al. ..................... | 524/785 |
| 5,716,679 | * 2/1998 | Krug et al. .......................... | 427/515 |
| 5,807,906 | * 9/1998 | Bonvallot et al. .................. | 430/330 |
| 5,849,373 | * 12/1998 | Barbour et al. ..................... | 427/576 |
| 5,891,366 | * 4/1999 | Gruenwald et al. ................ | 252/514 |
| 5,926,740 | * 7/1999 | Forbes et al. ....................... | 438/763 |
| 5,998,096 | * 12/1999 | Umemoto et al. .................. | 430/290 |

\* cited by examiner

*Primary Examiner*—Georgia Epps
*Assistant Examiner*—Evelyn A. Lester
(74) *Attorney, Agent, or Firm*—Heller Ehrman White & McAuliffe LLP

(57) ABSTRACT

Optical components have a material-distribution gradient due to nanometer-size particles embedded in a solid matrix. The components are manufactured by forming a dispersion of nanometer-size particles in a liquid, curable matrix material, causing the particles to migrate in the matrix material on the basis of a potential difference to form a distribution gradient, and subsequently curing the matrix material, retaining the distribution gradient. The method is suitable for use in the manufacture of optical lenses with a refractive index gradient.

20 Claims, No Drawings

OPTICAL COMPONENTS WITH A GRADED-INDEX STRUCTURE, AND METHOD OF MANUFACTURING SUCH COMPONENTS

The present invention relates to optical components with a gradient structure, especially optical components with a material gradient which is induced by nanoscale particles, and to a process for producing such optical components.

The electrophoretic deposition of particles in a suspension is based on the capacity of the particles to migrate in an electric field and, as a function of the polarity of their surface charge, to become deposited at one of the electrodes. The diffusion profile in this case is dependent, inter alia, on the size and distribution of the particles and on the viscosity of the medium.

Where the diffusive processes take place in a matrix which can be hardened subsequently, it is possible to "freeze in" the respective diffusion profile and so produce a gradient material.

In accordance with the invention it has been found that, in very general terms, the directed diffusion (migration) brought about by a potential difference of any kind, of particles, especially nanoscale particles, in a liquid, (preferably thermally and/or photochemically) curable matrix of appropriate viscosity (i.e. of a viscosity which (just) permits the diffusion of the particles) can be exploited for producing optical components with a material gradient structure. If, after the desired diffusion profile of the nanoscale particles has been established, this diffusion profile is frozen in by curing the matrix phase.

The present invention therefore provides optical components with a gradient structure, in which a material gradient (which can, for example, bring about a refractive-power gradient) is induced by nanoscale particles which are embedded in a solid matrix.

The present invention additionally provides a process for producing these optical components in which a potential difference is exploited to cause nanoscale particles dispersed in a liquid, curable matrix phase to migrate in the matrix phase, thereby leading to the formation of a material gradient, and the matrix phase is subsequently cured with retention of the material gradient.

The driving force which leads to the directed migration (diffusion) of the particles in the matrix can be generated, for example, by an electrical field (as in electrophoresis), a chemical (concentration) potential or an interface potential.

If the potential difference is to be generated by an electrical field, a possible procedure is, for example, to bring the liquid, curable matrix phase with, dispersed therein, nanoscale particles which carry a surface charge between two electrodes (anode and cathode) and to cause the nanoscale particles to migrate in the direction of the electrode having the polarity which is opposite to their surface charge. The surface charge on the nanoscale particles can be generated, for example, by establishing a pH which induces dissociation of groups on the surface of the nanoscale particles (e.g. $COOH \rightarrow COO^-$, metal-$OH \leftrightarrows$ metal-$O^-$). This approach presupposes, of course, that the viscosity of the matrix when an electrical field is applied, permits marked diffusion of the nanoscale particles. After the desired diffusion profile has become established, it is, so to speak, frozen in by curing the matrix to form a solid structure, by means of which it is possible to produce an optical component with a material gradient structure.

A chemical concentration potential can be generated, for example, as follows. In the case of the local (e.g. thermally and/or photochemically induced) polymerization of species with carbon-carbon multiple bonds, epoxy rings, etc., polymerization leads to a depletion of functional groups in the regions in which the polymerization takes place. (The term "polymerization" as used herein is intended to include not only addition polymerization but also polyaddition and polycondensation reactions.) This leads to a diffusion of species with as yet unreacted functional groups into the (heated or illuminated) regions in which the polymerization has taken place in order to compensate the chemical potential difference. In the case of photopolymers, this effect is known as the Colburn-Haines effect. In the heated or illuminated regions, this directed diffusion with subsequent polymerization leads to an increase in the density and thus to an increase in the refractive power. In the case of organic monomers, however, this change is small, since the small change in density which is established makes only a small contribution to the molar refraction. This does not apply, however, to nanoscale particles whose surface carries reactive groups capable of polymerization. In this case, the refractive-power gradient can be increased markedly in chemical potential by diffusion of the nanoscale particles, and it is possible to obtain gradient materials if, following diffusion, the matrix phase is cured, i.e. if, for example, the entire system is subjected to a thermally and/or photochemically induced polymerization. In this case, owing to the preceding immobilization of the diffused nanoscale particles (by polymerization), the material gradient is retained. An important prerequisite with this embodiment of the process of the invention as well, of course, is that the liquid matrix phase permits adequate diffusion of the nanoscale particles whose surface has been provided with reactive (polymerizable) groups; in other words, that the viscosity of the matrix phase is not excessively high.

A further option for generating a potential difference which leads to a diffusion of nanoscale particles that have been modified (on the surface) with appropriate groups in a matrix phase of appropriate viscosity to form a material gradient is to make use of the incompatibility between the surface of the nanoscale particles and the liquid matrix phase. If the nanoscale particles, for example, carry hydrophobic groups, such as fluorinated (alkyl) groups, on their surface, and the matrix phase has a hydrophilic or less hydrophobic character, the application of the liquid, hydrophilic matrix phase with hydrophobic nanoscale particles dispersed therein to a substrate causes the hydrophobic particles to migrate to the surface of the layer which leads to the lowest system energy. In general, this layer is the interface with the air, so that the hydrophobic or hydrophobically coated particles accumulate at the surface of the coating and become less concentrated at the interface with the substrate; after the coating has been cured, this produces both good adhesion between layer and substrate, and an easy-to-clean, low-energy surface.

In order to prevent separation of (hydrophilic) matrix phase and hydrophobic nanoscale particles even prior to application to a substrate, in the case of this embodiment of the process of the invention, a possible procedure, for example, is to add to the matrix phase a compatibilizer, which is removed (by evaporation, for example) after the composition has been applied to the substrate, or is incorporated stably into the matrix phase as the latter cures.

In the text below, the materials which can be employed in the process of the invention are described in more detail.

The nanoscale particles which can be employed in the process of the invention preferably have a diameter of not more than 100 nm, especially not more than 50 nm, and with particular preference, not more than 20 nm. As far as the lower limit is concerned, there are no particular restrictions, although this lower limit is for practical reasons generally 0.5 nm, in particular 1 nm and more frequently 2 nm.

The nanoscale particles comprise, for example, oxides such as ZnO, CdO, SiO$_2$, TiO$_2$, ZrO$_2$, CeO$_2$, SnO$_2$, Al$_2$O$_3$, In$_2$O$_3$, La$_2$O$_3$, Fe$_2$O$_3$, Cu$_2$O, V$_2$O$_5$, MoO$_3$ or WO$_3$; chalcogenides, examples being sulphides such as CdS, ZnS, PbS or Ag$_2$S; selenides, such as GaSe, CdSe or ZnSe; and tellurides, such as ZnTe or CdTe; halides, such as AgCl, AgBr, AgI, CuCl, CuBr, CdI$_2$ or PbI$_2$; carbides, such as CdC$_2$ or SiC; arsenides, such as AlAs, GaAs or GeAs; antimonides, such as InSb; nitrides, such as BN, AlN, Si$_3$N$_4$ or Ti$_3$N$_4$; phosphides, such as GaP, InP, Zn$_3$P$_2$ or Cd$_3$P$_2$; phosphates; silicates; zirconates; aluminates; stannates; and corresponding mixed oxides, for example those with the perovskite structure, such as BaTiO$_3$ or PbTiO$_3$.

These nanoscale particles can be prepared by conventional means: for example, by flame pyrolysis, plasma methods, colloid techniques, sol-gel processes, controlled nucleation and growth processes, MOCVD methods and emulsion methods. These methods are described in detail in the literature. The possible modification of the surface of the nanoscale particles with suitable functional groups (e.g. polymerizable or hydrophobic groups) is also known from the literature.

The nanoscale particles can also be prepared in situ in the presence of the liquid matrix phase (or parts thereof) using, for example, sol-gel processes.

The proportion of the nanoscale particles in the finished material gradient composite material comprising nanoscale particles and cured matrix phase is generally in the range from 0.5 to 80% by weight, more frequently from 1 to 50% by weight and, preferably, from 5 to 30% by weight.

The liquid matrix phase in which the nanoscale particles are dispersed can in principle comprise any desired species which, in the original state, leads to a viscosity appropriate for the diffusion of the nanoscale particles and which, following the establishment of the desired diffusion profile, can be transformed into the solid state with retention of this diffusion profile. Preferably, the matrix phase is cured thermally and/or photochemically.

Accordingly, the matrix phase preferably comprises a polymerizable organic monomer, oligomer and/or prepolymer and/or an inorganic compound which is capable of hydrolytic polycondensation and which may have been organically modified. In this context, the term "polymerizable" is intended to embrace not only species which can be converted into a polymer by (free-radical or ionic) addition polymerization but also those which give rise to a polymer by polyaddition or polycondensation reactions.

The polymers in the cured matrix phase may comprise any desired known plastics, examples being polyacrylic acid, polymethacrylic acid, polyacrylates, polymethacrylates, polyolefins, polystyrene, polyamides, polyimides, polyvinyl compounds, such as polyvinyl chloride, polyvinyl alcohol, polyvinylbutyral, polyvinyl acetate and corresponding copolymers, e.g. poly(ethylene-vinyl acetate), polyesters, examples being polyethylene terephthalate or polydiallyl phthalate, polyarylates, polycarbonates, polyethers, e.g. polyoxymethylene, polyethylene oxide and polyphenylene oxide, polyether ketones, polysulphones, polyepoxides, fluoropolymers, e.g. polytetrafluoroethylene, and organopolysiloxanes. The polymers concerned are preferably transparent. In the case of the above organic monomers, oligomers or prepolymers, therefore, preference is given to a polymerizable monomer, oligomer or prepolymer which contains unsaturated groups and which, on thermally or photochemically induced addition polymerization or on (optionally acid- or base-catalysed) polycondensation, or polyaddition, gives one of the abovementioned polymers.

Specific examples of polymerizable monomers which give a purely organic (polymer) matrix are (meth)acrylic acid, (meth)acrylic esters, (meth)acrylonitrile, styrene and its derivatives, alkenes (e.g. ethylene, propylene, butene, isobutene), halogenated alkenes (e.g. tetrafluoroethylene, chlorotrifluoroethylene, vinyl chloride, vinyl fluoride, vinylidene fluoride, vinylidene chloride), vinyl acetate, vinylpyrrolidone, vinylcarbazole and mixed monomers of this kind. Polyunsaturated monomers may also be present, examples being butadiene and (meth)acrylic esters of polyols (e.g. diols).

In addition to or instead of the above (purely) organic matrix materials, however, the matrix phase may also include inorganic species or organically modified inorganic species. In this context, mention may be made in particular of hydrolytically polycondensable compounds of Si, Al, B, Pb, Sn, Ti, Zr, V and Zn, especially those of Si, Al, Ti and Zr or mixtures thereof. With particular preference, the (optionally organically modified) inorganic, (at least) hydrolytically polycondensable starting compounds are those of Si, especially those having the following general formulae (I) and (II), and corresponding precondensates:

$$SiX_4 \qquad (I)$$

in which the radicals X are identical or different and are hydrolysable groups or hydroxyl groups;

$$R^1{}_a R^2{}_b SiX_{(4-a-b)} \qquad (II)$$

in which $R^1$ is a non-hydrolysable radical, $R^2$ is a radical which carries a functional group, X is as defined above and a and b have the values 0, 1, 2 or 3, the sum (a+b) having the value 1, 2 or 3.

In the above formulae, the hydrolysable groups X are, for example, hydrogen or halogen (F, Cl, Br or I), alkoxy (preferably $C_{1-6}$-alkoxy, such as methoxy, ethoxy, n-propoxy, i-propoxy and butoxy), aryloxy (preferably $C_{6-10}$-aryloxy, such as phenoxy), acyloxy (preferably $C_{1-6}$-acyloxy, such as acetoxy or propionyloxy), alkylcarbonyl (preferably $C_{2-7}$-alkylcarbonyl, such as acetyl), amino, monoalkylamino or dialkylamino having preferably 1 to 12, especially 1 to 6 carbon atoms in the alkyl group or groups.

The non-hydrolysable radical $R^1$ is, for example, alkyl (preferably $C_{1-6}$-alkyl, such as methyl, ethyl, n-propyl, isopropyl, n-butyl, s-butyl and t-butyl, pentyl, hexyl or cyclohexyl), alkenyl (preferably $C_{2-6}$-alkenyl, such as vinyl, 1-propenyl, 2-propenyl and butenyl), alkynyl (preferably $C_{2-6}$-alkynyl, such as acetylenyl and propargyl) and aryl (preferably $C_{6-10}$-aryl, such as phenyl and naphthyl).

These radicals $R^1$ and x can if desired carry one or more customary substituents, such as halogen or alkoxy.

Specific examples of the functional groups of the radical $R^2$ are epoxy, hydroxyl, ether, amino, monoalkylamino, dialkylamino, amido, carboxyl, mercapto, thioether, vinyl, acryloxy, methacryloxy, cyano, halo, aldehyde, alkylcarbonyl, sulphonic acid and phosphoric acid groups. These functional groups are attached to the silicon atom preferably by way of alkylene, alkenylene or arylene bridge groups, which may be interrupted by oxygen or sulphur atoms or by -NH groups. These bridge groups are derived, for example, from the abovementioned alkyl, alkenyl or aryl radicals. The bridge groups of the radicals $R^2$ contain preferably 1 to 18, especially 1 to 8 carbon atoms.

In the general formula (II) a is preferably 0, 1 or 2, b is preferably 1 or 2, and the sum (a+b) is preferably 1 or 2.

Particularly preferred hydrolysable silanes of the general formula (I) are tetraalkoxysilanes, such as tetraethoxysilane (TEOS) and tetramethoxysilane. Particularly preferred organosilanes of the general formula (II) are epoxysilanes, such as 3-glycidyloxypropyltrimethoxysilane (GPTS), and silanes which have reactive polymerizable double bonds, such as 3-methacryloxypropyltrimethoxysilane. The silanes just referred to, and their functional groups, are preferred for their ability (following hydrolytic poly-condensation) to be used for a polyaddition reaction or addition polymerization reaction with, for example, the abovementioned polymerizable organic monomers, oligomers and/or prepolymers, and/or to react with reactive groups on the surface of the nanoscale particles and so to contribute to the immobilization of the nanoscale particles (by binding them into a network, for example).

The hydrolysis and polycondensation of the above compounds is carried out in a conventional manner, in the absence or presence of an acidic or basic condensation catalyst such as HCl, $HNO_3$ or $NH_3$. For instance, hydrolysis and polycondensation can take place under the (widely known) conditions of the sol-gel process.

For preparing the liquid matrix phase with nanoscale particles dispersed therein, a preferred procedure is either
(a) to disperse the (already prepared) nanoscale particles in a solution containing the matrix-forming components) and then to remove the solvent; or
(b) to generate the matrix phase in the presence of the nanoscale particles; or
(c) to generate the nanoscale particles in the presence of the matrix phase.

The above alternative (a) is particularly advantageous when the matrix-forming components are polymerizable organic monomers, oligomers or prepolymers which, owing to their aggregate state or flow properties (for example, the fact that they are viscous), do not permit satisfactory dispersion of the nanoscale particles.

The above alternative (b) is of particular interest when the matrix phase is a precondensate of, for example, the above silane compounds of the formula (I) and/or (II) or is a polymer of a polymerizable organic monomer, while alternative (c) may, for example, be of advantage when both matrix phase and nanoscale particles are to be prepared by the sol-gel method (see, for example, the working examples indicated below).

Especially when it is intended that thermally and/or photochemically polymerizable or polycondensable compounds or functional groups will participate in the curing of the matrix phase, the liquid matrix phase with nanoscale particles dispersed therein preferably includes at least one polymerization initiator which is able to induce, thermally and/or photochemically, the polymerization and curing of the unsaturated compound or functional group. Photoinitiators which can be employed are, for example, the commercially obtainable initiators. Examples of these are Irgacure® 184 (1-hydroxycyclohexyl phenyl ketone), Irgacure® 500 (1-hydroxycyclohexyl phenyl ketone, benzophenone) and other photoinitiators of the Irgacure® type obtainable from Ciba-Geigy; Darocur® 1173, 1116, 1398, 1174 and 1020 (obtainable from Merck), benzophenone, 2-chlorothioxanthone, 2-methylthioxanthone, 2-isopropylthioxanthone, benzoin, 4,4'-dimethoxybenzoin, benzoin ethyl ether, benzoin isopropyl ether, benzil dimethyl ketal, 1,1,1-trichloroacetophenone, diethoxyacetophenone and dibenzosuberone.

Suitable thermal initiators include organic peroxides in the form of diacyl peroxides, peroxydicarbonates, alkyl peresters, dialkyl peroxides, perketals, ketone peroxides and alkyl hydroperoxides. Specific examples of thermal initiators of this kind are dibenzyl peroxide, tert-butyl perbenzoate and azobisisobutyro-nitrile.

Polymerization catalysts which induce polycondensation are, for example, Bronsted acids and bases such as mineral acids or tertiary amines, for anionic polycondensation, and Lewis acids, such as metal alcoholates (e.g. Aluminum alcoholates in the case of epoxysilanes), for cationic polycondensation.

Where there is participation of epoxide groups (for example, in the curing of the matrix phase), it is particularly advantageous to add ring-opening catalysts such as, for example, N-alkylimidazoles.

The polymerization initiator is normally employed in an amount of from 0.1 to 5% by weight, preferably from 0.5 to 3% by weight, based on the dispersion.

In addition, the dispersion may comprise other additives which are customary for optical systems, examples being dyes, photochromic and thermochromic substances.

To produce optical components, a dispersion as described above can be applied, for example, to an appropriate substrate or placed in a mould, after which the directed diffusion of the nanoscale particles in the matrix phase is allowed to take place and then the matrix phase is cured with retention of the material gradient. The substrates selected for coating are preferably those suitable for optical applications, examples being glass, ceramic, silicon, metal, semiconductor materials or (preferably transparent) plastics.

They can be coated by customary methods, for example by dipping, flooding, knife-coating, flow-coating, spin-coating, spray-coating or brushing. Preferred coat thicknesses (in the cured state) are from 0.2 to 30 μm.

Following the establishment, brought about by a potential difference, of the diffusion profile of the nanoscale particles, the coating which has been applied to the substrate is cured thermally and/or by irradiation (for example, with a UV emitter, a laser, etc.) depending on the nature of the polymerization initiator used and on the nature of the components employed for the matrix phase. The curing conditions (temperature, UV wavelength, etc.) in the case of the polymerization of unsaturated groups depend on the decomposition conditions of the polymerization initiator. Thermal curing usually takes place at temperatures below 150° C. If only inorganic components are involved in the curing of the matrix phase, the hydrolytic polycondensation can also be carried out at higher temperatures (e.g. up to 500° C.).

In the case of the production of mouldings, the dispersion can, for example, be poured into appropriate moulds, after which the procedure is analogous to that described above for the coating of substrates.

If, for example, a coating is desired whose surface is easy to clean, an example of a possible procedure according to the invention is to employ nanoscale particles having hydrophobic groups (e.g. fluoroalkyl groups) on the surface and to disperse these particles in a hydrophilic matrix (e.g. a precondensate based on the abovementioned silanes). After the resulting dispersion has been applied to the substrate (and any compatibilizer removed), the hydrophobic particles migrate towards the interface with air, so that the nanoscale particles with their hydrophobic groups accumulate at this interface and thus lead to an easy-to-clean, low-energy surface. This results at the same time in there being no, or virtually no, hydrophobic groups remaining at the interface between coating and substrate, thereby producing good adhesion between substrate and coating.

In very general terms, the optical components (optical elements) of the invention are preferably solid structures, photoconductive optical layers, or transparent substrates provided with gradient layers.

The process of the invention is particularly suitable for producing all optical components in which a material gradient is desired; for example, for optical lenses with gradients in the refractive index. Alternatively it can be used, for example, to produce structured optical components. In the latter case a possible procedure, for example, is to carry out local photopolymerization, with the aid of irradiation through a mask or by means of interference phenomena, leading as described above to a concentration potential, in which case nanoscale particles with polymerizable groups on the surface migrate into the exposed regions where they are immobilized by polymerization. After accumulation and immobilization in the exposed regions have taken place, the entire matrix phase can be cured—likewise by photopolymerization, for example.

When a laser is used as the light source, it is possible by means of holographic techniques to produce both periodic grid structures and Fresnel structures. The interference-induced intensity profiles act as polymerization sinks.

The examples which follow serve to illustrate further the present invention.

EXAMPLE 1

1 mol of 3-methacryloxypropyltrimethoxysilane is hydrolysed with 1.5 mol of double-distilled water (containing 0.1 mol of HCl) for 5 minutes in order to prepare a precondensate. Separately, 0.1 mol of zirconium tetrapropylate is mixed together with 0.1 mol of methacrylic acid and this mixture is stirred at room temperature for 15 minutes and, in order to produce nanoscale particles, is added to the above hydrolysate, after which the resulting mixture is stirred for a further 4 hours. After this time, 0.15 mol of double-distilled water is added and stirring is continued at room temperature for 12 hours. Subsequently, 1 mol of tetraethylene glycol dimethacrylate is added, followed by 0.4 mol % of photoinitiator per double bond present. The choice of photoinitiator is determined by the wavelength of the radiation source used.

The solvent-free sol is placed in a cylindrical metal container (platinum, diameter 10 mm) which serves as the anode. Located centrally in the cylinder, in addition, is a gold wire with a diameter of 50 $\mu$m which serves as the cathode. A direct-current voltage of 110 volts is applied, and the system is exposed through the front face of the cylinder with a UV lamp (2.2 W/cm$^2$). The polymerization which takes place leads to an increase in the viscosity of the system. After 36 hours, the gold wire is removed by withdrawing it slowly from the cylinder. At this point, the light source is switched off. After about 10 minutes, the resulting disruption to the system has levelled out and exposure is continued, with the zirconium oxide concentration profile which has become established being frozen in by the ongoing polymerization of the system.

Cylindrical monoliths with no streaking are obtained. By means of grinding and polishing processes it is possible to produce gradient lenses with optical effect in any desired thicknesses. Ellipsometry is used to determine a rise in refractive power between lens edge and lens centre of 0.07 (at 500 nm).

EXAMPLE 2

The coating material prepared in Example 1 is employed without tetraethylene glycol dimethacrylate. For layer production, glass fibres of 10 $\mu$m in diameter are employed as spacers between two glass substrates. The coating material is introduced between the glass substrates by means of capillary forces.

One side of the resulting sandwich structure is covered over with a mask, which possesses a transparent region with a slot width of 20 $\mu$m. The material between the glass plates is exposed with a UV lamp for 10 minutes in the transparent region of the mask. A refractive-power profile is built up, and a cylinder lens of 10 $\mu$m in diameter is produced. The refractive-power profile is fixed by removing the mask and curing the film between the glass substrates completely with UV light. A maximum rise in refractive power of 0.01 at 500 nm is measured.

EXAMPLE 3

Example 2 is repeated but not with exposure through a mask; instead, periodic intensity modulations are produced by holographic mixing of two waves with the aid of interference effects. The material between the glass substrates is exposed with these intensity modulations. A grid structure is built up which possesses the same periodicity as the intensity modulations. The refractive-power profile is frozen in by screening off one of the writing beams used in the experiment and using the remaining beam for a postpolymerization. In this way, volume holograms with diffraction efficiencies of 75% are produced.

EXAMPLE 4

The text below describes the production of a gradient material by coating nanoparticles with silanes having fluorinated side chains and incorporating the modified nanopowders into a hydrophilic matrix. To minimize the overall energy of the system, there is diffusion of the particles to the surface. The diffusion was detected by measuring the contact angles of the cured layers.

(a) Preparing the modified powders 5 g of Disperal® (boehmite nanopowder with primary particle sizes of about 15 nm) are stirred in 100 ml of toluene. Following three minutes of disintegration with the aid of an ultrasonic disintegrator, varying amounts (depending on the desired degree of covering) of 1H,1H,2H,2H-perfluorooctyltriethoxysilane (FTS) are added with stirring at room temperature.

The amount of the corresponding modifier depends on the calculated maximum possible hydroxyl group density on the surface of the boehmite particles and can itself be calculated. Knowing the specific surface area of the powder used, which was determined experimentally by measuring the BET adsorption isotherms, it is possible to determine approximately from a formula the number of surface OH groups. This calculation assumes a space requirement of 18 Å$^2$ per OH group.

$$\text{Number of surface OH groups } [1/g] = \frac{\text{oxide surface area } [m^2/g]}{\text{space requirement of one OH group } [m^2]}$$

Dividing the values obtained by Avogadro's constant, $N_A$, gives the stoichiometric (st) amount to be employed of a modifier, in mol. The amounts of modifier (FTS) used for the modification are summarized in the table below:

| Amounts of FTS employed | [mol/5 g AlOOH] | [g/5 g AlOOH] |
|---|---|---|
| 0.25 st | $2.006 \cdot 10^{-3}$ | 1.023 |
| 0.50 st | $4.013 \cdot 10^{-3}$ | 2.048 |

The reaction mixture is subsequently heated to 100° C. over the course of 10 minutes with stirring on a reflux condenser and is held at this temperature for 5 hours. To remove the solvent, the latter is distilled off by a rotary evaporator (60° C., 30 mbar). The powder is washed with twice 50 ml of toluene and dried at 130° C. in a drying cabinet for 10 hours.

(b) Preparing the sols: synthesizing the sols of the model system comprising 3-glycidyloxy-propyltrimethoxysilane (GPTS), bisphenol A (BPA) and 1-methylimidazole (MI)

9.46 g (0.04 mol) of GPTS are stirred for 1 hour with 2.16 g of 0.1 N HCl. 0.5 g of the respective modified powder is added to the clear precondensate, and disintegration is carried out for 2 minutes with an ultrasonic disintegrator. After stirring for 2 hours, 3.6 g ($16 \cdot 10^{-3}$ mol) of BPA are added and the mixture is diluted with 10 g of butylene glycol. After 1 hour of stirring, during which the BPA dissolves completely, 0.16 g ($2 \cdot 10^{-3}$ mol) of 1-methylimidazole (MI) is added as initiator, and coating takes place over the course of 30 minutes.

(c) Producing coatings

The substrates used are microscope slides (MS). The MS are dip-coated on both sides with a dipping machine which removes the substrates from the sol at a defined speed.

The coats are cured thermally in preheated ovens at a temperature of 130° C. After one hour, the cured coats are removed and left to cool to room temperature in the air.

(d) Characterization

For all of the coatings produced, the adhesion was evaluated by the crosshatch test (CT) (0-1) and the tape test (0-1).

The scribe hardness of the (fully transparent) coats was 1–3 g Vickers hardness depending on coat thickness (5–10 µm).

The table below gives an overview of the measured contact angles as a function of the concentration of fluorosilane (FTS).

| FTS content of the AlOOH powder | Contact angle to $H_2O$ [°] of particle |
|---|---|
| none | 68 |
| 0.25 st | 90 |
| 0.5 st | 95 |

It can be seen from the contact angles that by incorporating 0.25 st of FTS-modified powders the contact angle of the cured coats increases from 68° to 90°, and with 0.5 st of FTS-modified powders, it is possible to achieve a further increase to 95°. These values demonstrate an accumulation of the fluorinated side chains at the surface of the coats.

EXAMPLE 5

This example describes the preparation of a gradient material by in situ coating of nanoparticles by FTS in the system GPTS/BPA/MI/AlOOH. The binding of the FTS to the particle surface takes place in this case by the minimization of system energy in the course of the adsorption and alignment of the fluorinated species at hydrophilic surfaces. This is provided by the high OH group density at the AlOOH particles.

(a) Preparing GPTS/BPA/MI/AlOOH sols with different concentrations of FTS 1.62 g of 0.1 N HCl are added to 4.73 g (0.02 mol) of GPTS and the mixture is stirred for 30 minutes. 0.58 g of Disperal® Sol P3 (boehmite nanoparticles, about 10 nm primary particle size) is added as a solid, and the mixture is stirred for 10 hours. The suspensions, which are of low translucency, are disintegrated for 2 minutes, and then FTS is added in concentrations of between 0.1 and 7 mol- %. The amounts of FTS added, based on the GPTS employed, are set out in the following table:

| Amount of FTS employed [mol-%] | Amount of FTS employed [g] |
|---|---|
| 0.1 | 0.005 |
| 0.25 | 0.013 |
| 0.5 | 0.025 |
| 0.75 | 0.038 |
| 1 | 0.051 |
| 2 | 0.102 |
| 3 | 0.153 |
| 4 | 0.204 |
| 5 | 0 255 |
| 6 | 0.306 |
| 7 | 0.357 |

0.08 g ($1 \cdot 10^{-3}$ mol) of 1-methylimidazole is added as initiator to each of the sols, and further processing takes place within 30 minutes.

(b) Producing coatings

Coating and thermal curing take place as described in Example 4.

(c) Characterization

Characterization takes place as described in Example 4.

The scribe hardness of the (completely transparent) coats was 1–3 g Vickers hardness depending on the thickness (5–10 µm).

Up to an FTS concentration of 1 mol- %, the contact angle rises almost linearly with the addition of FTS. Thereafter, the surface begins to become saturated with fluorinated side chains. At 7 mol- %, a contact angle of 115° with water is achieved.

A drastic increase in the contact angles to $H_2O$ is also evident in the case of the in situ binding, with good wetting and adhesion properties, which demonstrates the fluorine gradient of the coat. In the case of an equal distribution throughout the coat, severe wetting and adhesion problems must be expected, which were shown in comparative investigations with AlOOH, since in that case the FTS had an adsorption surface available only at the surface of the substrate.

To calculate the surface energy, a goniometer was used to detect the contact angles to glycerol, 1-octanol, hexadecane and water on the coated MSs, and the surface energies at the different fluorosilane contents were determined in accordance with the evaluation technique of Wu. By plotting the values in graph form it is possible to see the reduction in the surface energy with increasing content of FTS from 42 mJ/m$^2$ (0 mol-%) to 19 mJ/m$^2$ (7 mol-%), which points to saturation of the surface with fluorinated side chains. Therefore, surface properties similar to those of Teflon® (about 23 mJ/m$^2$) are achieved with a much lower fluorine content.

What is claimed is:

1. An optical component having a gradient structure in which the gradient structure is a concentration gradient of nanoscale particles embedded in a solid polymeric matrix.

2. A process for producing an optical component having a gradient structure that is a concentration gradient of nanoscale particles embedded in a solid polymeric matrix, comprising:

preparing a dispersion of the nanoscale particles in a liquid, curable matrix phase comprising polymerizable compounds selected from organic compounds, organically modified inorganic compounds, inorganic compounds, and mixtures thereof;

causing the nanoscale particles to migrate in the matrix phase on the basis of a potential difference to form a concentration gradient of the nanoscale particles in the matrix phase; and curing the matrix phase with retention of the concentration gradient of the nanoscale particles.

3. A process according to claim 2 in which the nanoscale particles have a diameter of not more than 50 nm.

4. A process according to claim 3 in which the nanoscale particles have a diameter of not more than 20 nm.

5. A process according to claim 2 in which the nanoscale particles comprise an oxide, a chalcogenide, a halide, a carbide, an arsenide, an antimonide, a nitride, a phosphide, a phosphate, a silicate, a titanate, a zirconate, a stannate, an aluminate, or a mixed oxide.

6. A process according to claim 2 in which the liquid matrix phase comprises a polymerizable organic monomer, oligomer, or prepolymer, a hydrolysable silane of the general formula $SiX_4$ (in which the radicals X are identical or different and are hydrolysable groups or hydroxyl groups) or $R^1_a R^2_b SiX_{(4-a-b)}$ (in which $R^1$ is a non-hydrolysable radical, $R^2$ is a radical which carries a functional group, X is as defined above, and a and b each have the value 0, 1, 2 or 3, with (a+b) having the value 1, 2 or 3), or a precondensate derived therefrom, or a mixture thereof.

7. A process according to claim 2 in which at least one of a thermal polymerization initiator and a photochemical polymerization initiator is incorporated into the liquid, curable matrix phase, and the step of curing the matrix phase comprises at least one of thermal and photochemical curing.

8. A process according to claim 2 in which the step of preparing the dispersion of nanoscale particles in the liquid, curable matrix phase comprises either:

(a) dispersing the nanoscale particles in a solution containing at least one matrix-forming component, and then removing the solvent; or (b) generating the matrix phase in the presence of the nanoscale particles; or (c) generating the nanoscale particles in the presence of the matrix phase.

9. A process according to claim 2, comprising:

preparing the dispersion of nanoscale particles in the liquid, curable matrix phase;

applying the dispersion of nanoscale particles in the liquid, curable matrix phase to a transparent substrate, causing the nanoscale particles to migrate in the matrix phase on the basis of a potential difference to form the concentration gradient of the nanoscale particles in the matrix phase; and curing the matrix phase with retention of the concentration gradient of the nanoscale particles.

10. A process according to claim 9 in which the concentration gradient is formed by migration of nanoscale particles with hydrophobic surface groups towards an interface between the more hydrophilic matrix phase and air.

11. A process according to claim 2, comprising:

preparing the dispersion of nanoscale particles in the liquid, curable matrix phase;

placing the dispersion of nanoscale particles in the liquid, curable matrix phase into a mold, causing the nanoscale particles to migrate in the matrix phase on the basis of a potential difference to form the concentration gradient of the nanoscale particles in the matrix phase; and curing the matrix phase with retention of the concentration gradient of the nanoscale particles.

12. A process according to claim 2 in which the optical component is an optical lens with a refractive index gradient.

13. A process according to claim 2 in which the optical component is a microoptical component produced by employing a microstructuring method where the potential difference is a plurality of chemical potential differences each induced by local polymerization.

14. A process according to claim 2 in which the optical component comprises a solid structure, a photoconductive optical layer, or a transparent substrate provided with a gradient layer.

15. A process for producing an optical component having a gradient structure that is a concentration gradient of nanoscale particles embedded in a solid polymeric matrix, comprising:

preparing a dispersion of the nanoscale particles in a liquid, curable matrix phase comprising polymerizable compounds selected from organic compounds, organically modified inorganic compounds, inorganic compounds, and mixtures thereof;

causing the nanoscale particles to migrate in the matrix phase on the basis of a potential difference selected from a potential difference generated by applying an electrical field, a chemical potential difference, and a potential difference based on different interface potentials, to form a concentration gradient of the nanoscale particles in the matrix phase; and curing the matrix phase with retention of the concentration gradient of the nanoscale particles.

16. A process according to claim 15 in which the potential difference is generated by applying an electrical field.

17. A process according to claim 15 in which the potential difference is a chemical potential difference.

18. A process according to claim 17 in which the chemical potential difference is induced by local polymerization.

19. A process according to claim 15 in which the potential difference is based on different interface potentials.

20. A process according to claim 19 in which the different interface potentials are induced by nanoscale particles with hydrophobic surface groups in a more hydrophilic matrix phase.

* * * * *